350-392 SR CROSS REFERENCE SEARCH ROOM
XR 3,083,262

March 26, 1963 J. M. N. HANLET 3,083,262

SOLID STATE CAMERA APPARATUS AND SYSTEM

Filed Nov. 25, 1960 2 Sheets-Sheet 1

INVENTOR:
Jacques M.N. Hanlet
By Warren T. Jessup
Attorney

3083262
OR IN 358/213

INVENTOR:
Jacques M. N. Hanlet

By Warren T. Jessup
Attorney.

United States Patent Office 3,083,262
Patented Mar. 26, 1963

3,083,262
SOLID STATE CAMERA APPARATUS AND SYSTEM

Jacques M. N. Hanlet, Pacific Palisades, Calif., assignor to Electro Radiation, Inc., Santa Monica, Calif., a corporation of Delaware Filed Nov. 25, 1960, Ser. No. 71,773
13 Claims. (Cl. 178—7.1)

The present invention relates to a new and improved solid state apparatus and system for storing, by molecular effects, a visual image of a scene or object, and for subsequently converting the stored image into electrical signals.

The usual device for converting a pictorial scene or image into electrical signals is the present-day Iconoscope. The Iconoscope is a scanning device, and it receives a visual image and transforms the image into an electrical signal. This device has a photosensitive surface; and it also includes an electron gun, and a suitable focusing means for the electron beam emanating from the gun.

The photosensitive surface of the Inconoscope is a mosaic structure composed of a multiplicity of photo-elements. The image to be stored in the Iconoscope and transformed into electrical signals is focused onto the mosaic photosensitive surface, and its light and shade values cause a plurality of capacitive elements associated with respective ones of the photo-elements to assume corresponding electric charges.

As the mosaic of the Iconoscope is scanned by an electron beam; the resulting current flow through the capacitive elements, and through a common output impedance, represents in electrical form the light and shade values of the stored image. The resulting electrical output signal appearing across the common impedance is representative, therefore, of the image stored in the Iconoscope.

The prior art Iconoscope, as described above, is a somewhat bulky and cumbersome piece of equipment, and it is relatively difficult and expensive to construct. In addition, the image can be stored in the Iconoscope for a limited time interval only, due to leakage of the capacitive elements. The present invention provides a new and improved solid state electronic camera whcih utilizes the principle of ferroelectricity and photoconductivity for storing visual images by molecular effects, and for subsequently converting the stored visual images into corresponding electrical signals.

It is, accordingly, an object of the present invention to provide a new and improved solid state electronic camera unit which is capable of operating at a high rate of speed, and which is capable of electronically registering a visible image and of retaining the image for any desired length of time.

Another object of the invention is to provide such an improved solid state electronic camera unit which can be small in size and which can be energized by relatively low level signals.

A further object of the invention is to provide such an improved solid state electronic camera in which the storing of the visual image in the camera, the reading of the stored image to convert its light and shade values to elecrtical signals, and the erasing of the stored visual image, may be accomplished with a minimum of associated electronic circuitry.

Yet another object of the invention is to provide such an improved electronic camera which is capable of registering the visual image in an extremely short time interval, and which is capable of scanning the image for read-out purposes in as long an interval as may be desired, so as to permit slow analysis of the stored image and relatively narrow transmission frequency bands.

A further object of the invention is to provide such an improved electronic camera which is capable of resolution limited only by the wave-length of the incident light and by the optical characteristics of the optical system, which resolution is unaffected by the structure of size of the unit.

The features of the invention which are believed to be new are set forth with particularly in the claims. The invention itself, however, together with further objects and advantages thereof, may best be understood by reference to the following specification when considered in conjunction with the accompanying drawings in which:

The properties of ferroelectricity are observed in certain crystalline dielectrics which have reversible polarization as shown by a dielectric hysteresis loop. Such materials have a domain structure which is visible in polarized light. These domains result from a twinning in the ferroelectric crystal. When such twinning is repeated in the same plane, it gives rise to a series of lamellae which may be oriented with respect to the optical axis in response to an electric signal applied across the unit.

Figures 1, 2:
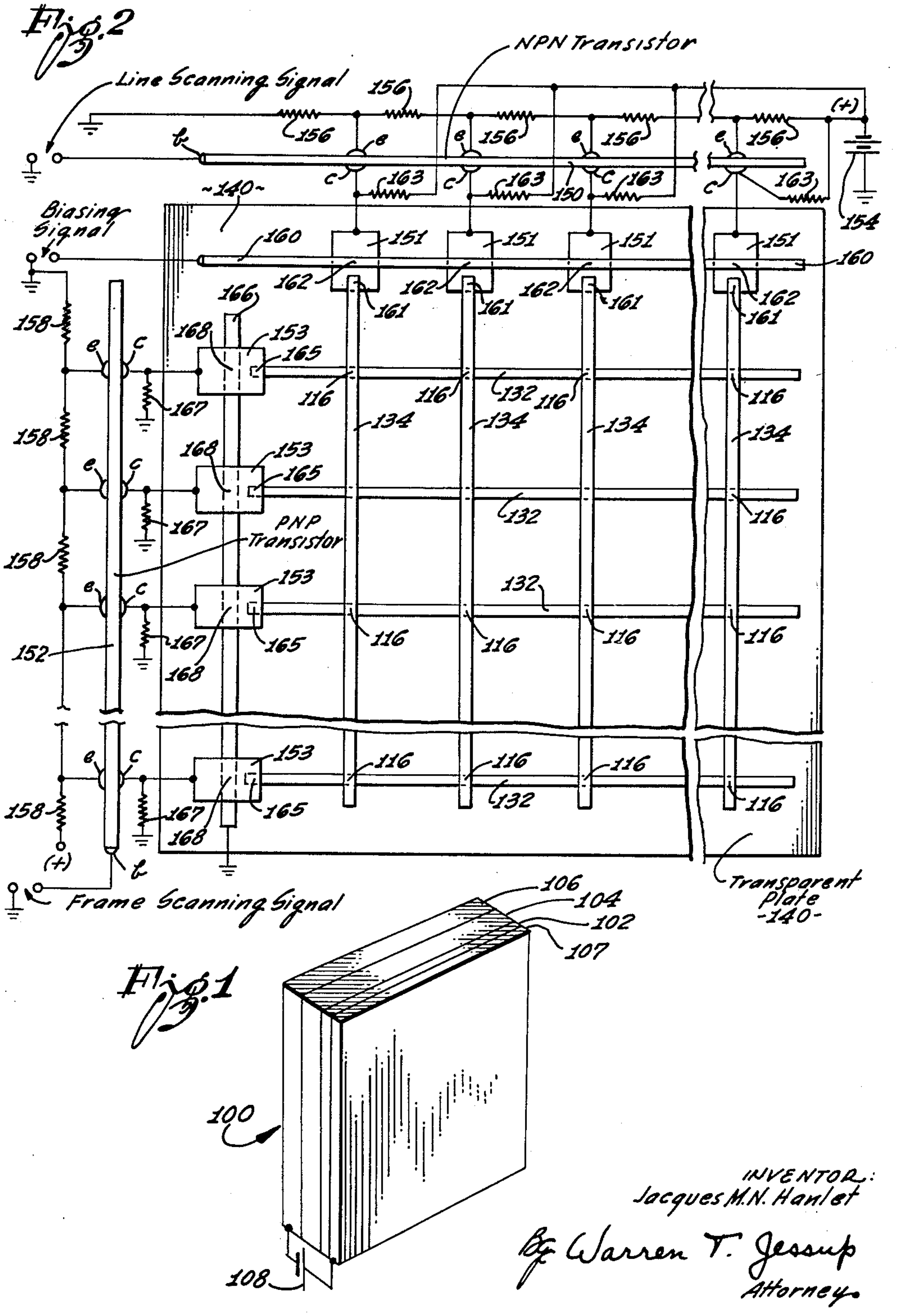
FIGURE 1 is a perspective view of a photosensitive storage unit which is constructed in accordance with the concepts of the invention and which forms a component of the electronic camera apparatus and system of the invention.
FIGURE 2 is a representation of a scanning system which permits a multiplicity of light beams to be successively incident upon a surface of the storage unit of FIGURE 1 at successive localized areas of the surface so that a light beam is effectively repeatedly scanned in a line and field sequence over that surface.

The properties and principles discussed in the preceding paragraph are used in conjunction with photo-conductive principles to constitute the photo-sensitive storage unit of FIGURE 1. This unit, as will be described, forms an important component in the electronic camera apparatus of the invention.

Figures 3, 4, 5, 6:
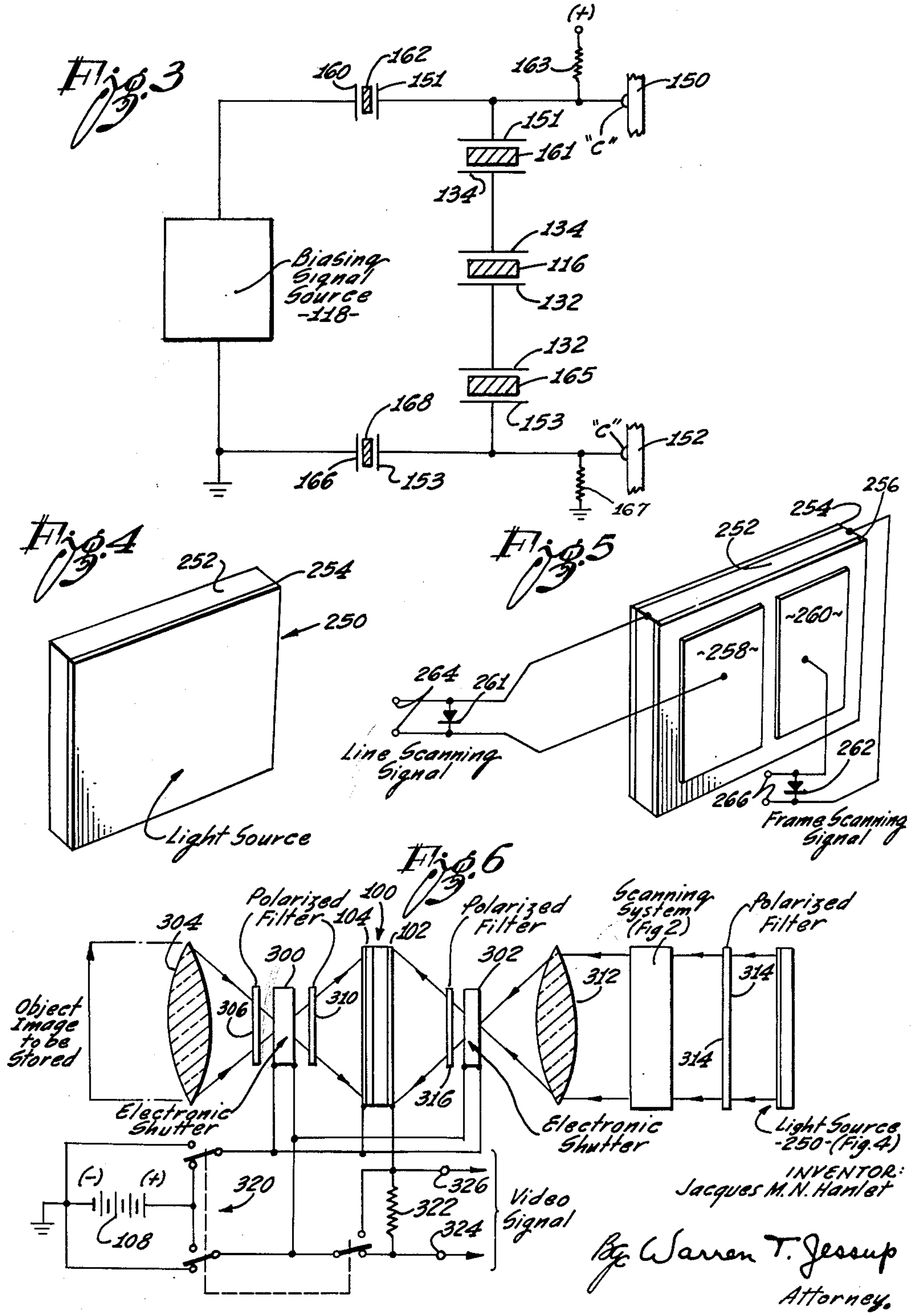
FIGURE 3 is a fragmentary circuit diagram illustrating in schematic form the manner in which scanning signals are effective in the scanning system of FIGURE 2 to activate in succession a plurality of light shutters therein, this diagram being useful in explaining the operation of the system of FIGURE 2.
FIGURE 4 is a perspective view of a light-emitting unit which may conveniently form a light source for use in the electronic camera unit and system of the invention.
FIGURE 5 is a rear view of the unit of FIGURE 4 and illustrative of the manner in which the unit may be adapted to constitute a source of scanning signals for the system of FIGURE 2.
FIGURE 6 is a schematic representation of an electronic camera apparatus and system constructed in accordance with one embodiment of the invention.

The electronic camera apparatus to be described in conjunction with FIGURE 6 is composed of a photo-sensitive storage unit of the type referred to above. The visual image to be transformed into electrical signals is projected onto one surface of the photo-sensitive unit, and the image is stored in the unit. The electronic camera of the invention also includes a scanning system for effectively causing a light spot to be scanned over the other surface of the photo-sensitive storage unit to transform the stored image into video electrical signals. The electronic camera unit of the invention further includes a light source, and it includes a source of scanning signals for the scanning system.

An appropriate photo-sensitive storage unit 100 is shown in FIGURE 1. The visual image to be converted into electrical signals is projected onto one surface of the unit 100, and the image is stored in the unit. The storage unit 100 of FIGURE 1, is constructed as a sandwichlike assembly. The assembly includes a layer 102 of a ferroelectric material and a layer 104 of a photo-conductive material disposed in side-by-side relationship. These two layers are sandwiched between two transparent electrically conductive electrodes 106 and 107. These layers and electrodes may be formed, for example, by vapor phase reactions. The transparent electrodes 106 and 107 may be made, for example, of rare metals such as gold or bismuth, or oxides thereof. When these metals are evaporated in a vacuum, they provide a high transparency in the visible spectrum, and they also exhibit relatively high electrical conductivity. It is well known that either organic or inorganic monocrystalline ferroelectric materials can be deposited as thin films from a vapor phase reaction.

The ferroelectric layer 102 may be composed of any suitable known ferroelectric material, and the photo-conductive layer 104 may be composed of any known activated photo-conductive material. The photo-conductive layer 104 may be evaporated in a vacuum, for example, over the ferroelectric layer 102. Properly doped cadmium selenide may be used to constitute the photo-conductive layer 104. The latter material provides very high sensitivity and responds to excitations as short as 17–20 microseconds.

A direct current source 108 is selectively connected across the two electrodes 106 and 107, as will be described in conjunction with FIGURE 6. When such a voltage is applied across the two electrodes, and with no light falling on the photo-conductive layer 104, the internal resistance of the cell is so high that no current flows from the direct current source 108 through the unit 100.

However, when light from an image passes through the transparent electrode 106 onto the photo-conductive layer 104, the resistance of the photo-conductive layer drops and assumes different values at different points on its surface in correspondence with the light and shade values of the image. As a consequence, the different resistance drops in the resistance of the photo-conductive layer 104 over its surface, causes the voltage across the ferroelectric layer 102 to increase accordingly to different values across its surface. This increased voltage across the ferroelectric layer 102 produces increased electrostatic fields across the localized portions of that layer which, in turn, produces localized domain rotations in the equivalent areas of the ferroelectric layer.

The domain rotations, mentioned above, result in a polarizing effect being exhibited by the ferroelectric layer 102 at the localized areas corresponding to the illuminated areas of the photo-conductive layer 104, which in turn correspond to the light and shade values of the image projected onto the photo-conductive layer.

The image projected onto the photo-conductive layer 104 of the unit 100 is stored, therefore, in the unit by the resulting localized domain rotations in the ferroelectric layer 102. As noted above, the extent of these localized domain rotations across the ferroelectric layer correspond respectively to the light and shade values of the image stored in the unit 100.

Now, if the unit 100 is effectively scanned by a polarized discrete light spot across the ferroelectric layer 102; with the voltage across the electrodes 106 and 107 being reversed, and with a load impedance being connected in series with the source of voltage, an electrical signal corresponding to the light and shade values of the stored image will be produced across the load impedance.

The above action will occur, because when the polarized light spot is incident upon any particular localized area on the ferroelectric layer 102, the intensity of the light reaching the corresponding area of the photoconductive layer will be dependent upon the domain rotation produced in the ferroelectric layer at that area by the stored image.

The resulting current flow through the series impedance for each incidence of the polarized light spot on different localized areas across the ferroelectric layer 102 will, therefore, be proportional to the intensity of light reaching the photo-conductive layer in each instance; which, in turn, is dependent upon the light or shade values of the stored image in that particular instance.

Since the voltage from the source is reversed during the polarized light spot scanning action described above, the resulting current flow through the unit 100 causes the domain rotations in the ferroelectric layer 102 to be in the opposite direction to the rotations produced by the stored image. Also, the rotations during the light spot scanning continues in each instance until the particular polarized light spot projected through the ferroelectric layer is cut off. Therefore, as the scanning action proceeds, the stored image is concurrently erased from the unit 100. At the end of each scanning operation, therefore, the unit 100 is ready to receive a new image.

If the reversed voltage 108 is significantly smaller than the voltage 108 at time of storage, then complete erasure will not occur, and several read-out scans can be made before erasure is complete.

A scanning system for causing light to be successively directed onto a surface of the storage unit 100 in successive localized sharply defined areas across the surface in a line and field scanning direction is shown in FIGURE 2. This scanning action causes the visual image stored in the unit 100 to be read out of the unit and to be thereby converted into an electrical signal. The scanning system of FIGURE 2 is similar in most respects to the system described in copending application Serial No. 67,950, filed November 8, 1960. It will be evident to those skilled in the art, however, that other suitable known types of polarized light spot scanning systems may be used.

The disclosed scanning system includes a mosaic of light shutter cells 116 arranged in the manner shown in FIGURE 2. The number of cells chosen depends on the resolution required. The spacing between the light shutter cells is greatly exaggerated in FIGURE 2 for purposes of clarity.

In forming the assembly of FIGURE 2, a plurality of transparent elongated strip electrodes 132 composed, for example, of gold, may first be formed. For this purpose, a transparent flat plate 140 of, for example, clear fused silica is provided. The transparent electrically conductive electrodes 132 are deposited on the plate 140 in the form of elongated rectangular strips spaced and parallel as shown. The individual electrodes 132 in this first set are individually spaced from one another in a manner to provide the required resolution, as noted.

The transparent electrodes 132 may be deposited on the sheet 140 by a chemical reaction, or by any other suitable technique, and in accordance with any of the processes presently known to the art. Simultaneously with the deposition of the electrodes 132, further transparent electrodes 151 and a transparent electrode 166 may be deposited on the plate 140.

The electrodes 151, as illustrated in FIGURE 2, have a rectangular configuration and they are disposed in side-by-side relationship across the top of the plate. The electrode 166, like the electrodes 132, is in the form of an elongated rectangular strip, and it is disposed in spaced relationship with the left hand ends of the electrodes 132 and at right angles to the electrodes 132.

A selected ferroelectric material may then be vacuum-deposited over the strip electrodes 132 and over the electrodes 151 and 166. This ferroelectric material may be vacuum-deposited over these electrodes as a layer having a thickness corresponding to a few microns. Under the subsequent action of heat in a controlled gaseous atmosphere, and of a polarizing electric field, a homogeneous coating of large crystallites of the ferrolectric material may be obtained over the required areas.

A plurality of transparent electrically conductive electrodes 134, and further transparent electrically conductive electrodes 153 and 160 are then formed on the transparent plate 140. These latter electrodes may be formed of the same material and by an operation similar to that used to produce the electrodes 132, 151 and 166. The electrodes 134 may also be in the form of rectangular strips, and they may have the same shape and spacing as the electrodes 132. The electrodes 134 are formed at right angles to the electrodes 132 and extend over the top of the ferroelectric material layer formed on the electrodes 132.

As illustrated, the upper ends of the electrodes 134 extend over the top of the ferroelectric material layers on respective ones of the electrodes 151. As noted, the electrodes 134 are positioned and spaced in parallel relationship, and perpendicular to the electrodes 132, as shown; the electrodes 132 also being disposed in spaced and parallel relationship. The electrode 160 is also formed in the shape of an elongated rectangular strip, and it extends across the ferroelectric material layers formed on respective ones of the electrodes 151. The strip electrodes 160 extend in spaced and parallel relationship with the strip electrodes 132. The electrodes 153, on the other hand, have a rectangular configuration, as illustrated in FIGURE 2, and these electrodes extend down the left hand side of the transparent plate 140. The electrodes 153 are formed over the ferroelectric layer on the electrode 166 and over the respective ends of the electrodes 132 on the ferroelectric layers on these electrodes.

Each intersection of an electrode 132 with a corresponding electrode 134 forms a ferroelectric light shutter cell 116. It has been found that a resolution of one hundred transparent electrically-conductive strip electrodes 132 or 134 per lineal inch, or more, can be made. This can be achieved by the use of conventional screening or photographic processes, such as commonly used in the manufacture of printed circuits. Resolutions higher than those obtained with present-day Iconoscopes can be obtained in the practice of the present invention, and without any difficulties.

The intersection of the strip electrodes 160 and respective ones of the electrodes 151 form respective capacitive cells 162. Likewise, the overlapping of the respective ends of the strip electrodes 134 and the rectangular electrodes 151 form respective capacitive cells 161. The rectangular electrodes 153 form similar capacitive cells 168 with the strip electrode 166, and the overlapping ends of the strip electrodes 132 form respective capacitive cells 165 with corresponding ones of the electrodes 153. These capacitive cells, in accordance with known principles, form ferroelectric capacitances.

The scanning system of FIGURE 2, as fully described in the copending application referred to above, uses an NPN conductivity type junction transistor 150 of a particular configuration, and it also uses a PNP conductivity type junction transistor 152 of a particular configuration. The disclosed junction transistors each has a property whereby an increasing base current results in a gradually decreasing gain which becomes zero for a given value of base current. The same characteristic is observable in both the NPN transistor 150 and in the PNP transistor 152. This characteristic is used to successively unblock paths between successive collector and emitter electrodes of the transistors.

The result of the configuration described above is a simple switching system in which a first single barrier NPN transistor 150 can be used to perform successive switching actions along the X—X axis, and a second single barrier PNP transistor 152 to perform successive switching actions along the Y—Y axis.

The transistor 150 has a plurality of collector electrodes *"c"* connected to respective ones of the plurality of electrodes 151 on the transparent plate 140. Furthermore, each collector electrode *"c"* is connected through a corresponding resistor 163 to the positive terminal of a suitable unidirectional potential source, such as the battery 154. The negative terminal of the battery is indicated as being connected to ground.

A plurality of biasing resistors 156, which may have equal values, are connected in series between the positive terminal of the battery 154 and ground. These resistors form a voltage divider. The common junctions of successive ones of the resistors 156 are connected to respective ones of a plurality of emitters *"e"* of the transistor 150. The transistor 150 also has a common base electrode *"b"* and a line scanning signal is applied to that electrode. The line scanning signal may be an analog signal of saw tooth configuration, which may be generated in a manner to be described, and which increases in amplitude in each cycle as a linear function of time.

In the circuitry disclosed in FIGURE 2, as the line scanning signal applied to the base electrode *"b"* increases in amplitude, the transistor 150 successively establishes a variation of potential between the collector electrodes *"c"* and the positive terminal of the unidirectional potential source, such as the battery 154, and subsequently successively removes the variation of potential so established. Therefore, the collectors *"c"* of the transsistor 150, and the respective electrodes 151 connected thereto, are successively established at a lower potential than the positive potential of the battery 154 and are then successively returned to the potential of the battery 154, this being accomplished under the action of the line scanning signal applied to the base *"b"* of the transistor 150.

The successive action described above occurs during each cycle of the line scanning signal. This action causes the electrodes 151, in each cycle of the line scanning signal, to become successively more negative during the scanning action and then to be successively returned to a potential equal to the potential of the positive terminal of the battery 154, this action sweeping from left to right in FIGURE 2.

In like manner, the group of transparent electrically conductive electrodes 153 on the plate 140 are connected to respective ones of the collector electrodes *"c"* of the PNP transistor 152. Each collector *"c"* is connected to a corresponding resistor 167, and each resistor is connected to the negative terminal of the battery 154 which, as noted, is grounded. A plurality of bias resistors 158, which may have equal values, are connected in series between the positive terminal of the battery 154 and ground. The common junctions of the resistors 158 are connected to respective ones of the emitters *"e"* of the transistor 152.

A frame scanning signal is applied to the base electrode *"b"* of the transistor 152. This frame scanning signal may be generated in a manner to be described, and it may have the same composition as the line scanning signal except that it has a much lower repetition frequency, and it is reversed in polarity.

Under the action of the frame scanning signal, the electrodes 153 are successively biased from ground potential to a positive voltage, and are then successively returned to ground potential, as the frame scanning signal increases in amplitude during each cycle thereof. This scanning action sweeps up from the bottom of the system in FIGURE 2 to the top.

The electrodes 151, which have been formed on the transparent plate 140 in the same manner, and at the same time, as the electrode 166 and the electrodes 132; and the electrodes 153, 160 and 134 which have been formed over the ferroelectric material on the former electrodes, result in a structure in which these electrodes 151 form respective ferroelectric capacitors 161 with respective ones of the electrodes 134 which, as illustrated, overlap corresponding ones of the electrodes 151. Likewise, each one of the electrodes 151 forms a respective ferroelectric capacitor 162 with each intersection of the electrodes 160.

The same result is obtained for the network of electrodes 132 which, as illustrated, overlap corresponding ones of the electrodes 153 to form respective ferroelectric capacitors 165. Simultaneously, each of the electrodes 153 forms a corresponding ferroelectric capacitor 168 at each intersection of the electrode 166. The electrode 166, as indicated, is connected to ground.

The operation of the system and apparatus of FIGURE 2 can best be understood by considering the circuit diagram of FIGURE 3. As noted above, each intersection of an electrode 134 with an electrode 132 forms one of the light shutter cells 116. The cell shown in FIGURE 3 represents any one of the cells 116. In series with the cell 116 illustrated in FIGURE 3 is a pair of ferroelectric capacitors 161 and 165. The ferroelectric capacitor 161 is formed by the electrodes 151 and 134, and the ferroelectric capacitor 165 is formed by the electrodes 132 and 153, as described above. As also described, the intersection of the electrodes 151 and 160 forms a ferroelectric capacitor 162, and the intersection of the electrodes 153 and 166 forms a ferroelectric capacitor 168. A biasing signal is applied across the capacitors 162 and 168, as that signal is applied between the electrodes 160 and the grounded electrode 166.

The collector *"c"* of the corresponding portion of the transistor 150 is connected to the electrode 151. The collector *"c"* of the corresponding transistor portion 152 is connected to the electrode 153. One of the resistors 163 connects the collector *"c"* of the transistor portion 150 to the positive terminal of the battery 154, and one of the resistors 167 connects the collector *"c"* of the transistor portion to ground.

It will be understood that each of the cells 116 in the system of FIGURE 2 is connected in a circuit similar to the circuit of FIGURE 3. The only difference between the control is that the corresponding transistor portions 150 and 152 become activated at different times for the different light shutter cells 116.

During the interval when the portions of the transistors 150 and 152 illustrated, for example, in FIGURE 3 are not activated, a unidirectional biasing signal from a source 118 causes the ferroelectric capacitor 161, 162, 165 and 168 to become charged to a maximum peak level established by the biasing signal.

During the de-activated states of the portions of the transistors 150 and 152 illustrated in FIGURE 3, as noted above, the ferroelectric capacitors 151 are all charged to a particular peak value by the unidirectional biasing signal from the source 118. Under these conditions, the corresponding light shutter cell is polarized to an effectively "closed" condition with respect to the passage therethrough of polarized light incident thereon.

However, when the transistor portion 152 of FIGURE 3 is activated, and this activation is followed by the activation of the transistor portion 150 of FIGURE 3, in the manner described above, the resulting potential change at the collectors of these transistor portions causes the ferroelectric capacitors 161 and 162 on one side of the light shutter cell 116 to be momentarily discharged, and the resulting potential change in the ferroelectric capacitors 165 and 168 on the other side of the cell 116 also to be momentarily discharged. This results in a voltage being introduced across the cell 116 which is a function of the value of the unidirectional biasing signal from the source 118. This causes the light shutter cell 116 to assume a polarized state at which it is "open" and a maximum translation of light therethrough is provided. This state is retained in the particular light shutter cell 116 until it is later returned to its original "closed" condition. This latter condition is achieved, for example, by reversing the polarity of the biasing signal from the source 118 during the above described scanning operation.

Therefore, under the application of the line and frame scanning signals as described above, a negative pulse appears at the electrode 151 in FIGURE 3 and across the resistor 163 as the corresponding portion of the transistor 150 is activated by the line scanning signal; and a positive pulse appears across the electrode 153 and across the resistor 167, as the frame scanning signal activates the corresponding portion of the transistor 152. This action occurs successively at the electrode 151 and 153 in the system of FIGURE 2 to "open" successive ones of the light shutter cells 116.

It is evident, therefore, that when both of the corresponding portions in FIGURE 3 of the transistors 150 and 152 are activated by the switching action of the line and frame scanning signals, the charge on the ferroelectric capacitors 161 and 162 on one side of the particular light shutter cell 116, and the charge on the ferroelectric capacitors 165 and 168 on the other side of the cell are made dissimilar in polarity. This permits the biasing signal from the source 118 to be applied across the particular light shutter cell 116, and thereby changing the state of polarization of the light shutter cell from a "closed" condition to an "open" condition, or from the "open" condition to the "closed" condition, depending on the polarity of the biasing signal.

However, and as described above, in the absence of an impulse across the resistors 163 and 167 due to the activation of the corresponding transistor portions by the line and frame scanning signals; the ferroelectric capacitors 161, 162 and 165, 168 are fully charged, and the biasing signal from the source 118 cannot flow through these capacitors, or through the capacitors 161 and 165, to open or close the corresponding light shutter cell 116.

In the manner described, therefore, and under the action of the line and frame scanning signals, the light shutter cells 116 are first successively "opened" by the biasing signal from the source 118. Due to the coercive characteristics of the ferroelectric material, the light shutter cells 116 remain open until a "closing" signal is introduced to them by reversing the polarity of the biasing signal. The light shutter cells 116 can be closed successively immediately following the opening of each corresponding cell and while the particular cell is still under the action of the scanning signals, or a separate scanning field can be incorporated after each "opening" field to close the light shutter cells.

The above described scanning system permits, therefore, a discrete light spot to be successively introduced to different localized areas across a surface, and for the light spot to be effectively scanned across the surface in a succession of multi-line field sequences.

An appropriate light source 250 for the scanning system of FIGURE 2 is shown in FIGURE 4. The particular light source in FIGURE 4 extends over an area equal to the area of the transparent plate 140 in the scanning system of FIGURE 2. The light source 250 includes a plate 252 composed, for example, of a radioactive material, or materials, such as tantalum and tritium. The side of the plate 252 facing the scanning system of FIGURE 2 is coated with a suitable phosphor 254. This phosphor, under excitation by the radiation from the radioactive plate 252, emits a light matching the response of the photoconductive layer used in the unit of FIGURE 1.

When so desired, a pair of plates may be formed on the rear side of the radioactive plate 252 of FIGURE 4, and in capacitive relationship therewith. These latter plates are shown in FIGURE 5, and they form a source of line and frame scanning signals suitable for application to the scanning system of FIGURE 2. For this purpose, a dielectric layer 256 is formed on the opposite side of the radioactive plate 252 from the phosphor coating 254. The layer 256 may be a coating of any suitable low-loss dielectric, and it should be very thin.

A pair of electrically conductive plates 258 and 260 are formed on the dielectric layer 256 by any known technique to constitute the plates referred to in the preceding paragraph. The plates 258 and 260, the interposed dielectric layer 256, and the radioactive plate 252 form a pair of capacitors. The radiations from the radioactive plate 252 causes these capacitors to become charged. The resulting voltage developed across the capacitors builds up in a usual exponential manner.

A Zener diode 261 may be connected across the capacitor formed by the plates 252 and 258, and is designed to break down when the voltage across this capacitor reaches a particular level as the capacitor is charged up. This results in an appropriate line scanning signal being produced across the terminals 264. A similar Zener diode may be connected across the capacitor formed by the plates 254 and 260, and this latter diode is designed to break down when the voltage across the latter capacitor reaches the particular value during its charging cycle, so that an appropriate frame scanning signal may be produced across the output terminals 266. Conversely, the pulses produced by the discharge of 254, 260 by 262 could be stored in a conventional diode counter to produce the frame scanning signal.

The structure of FIGURE 5, and the parameters of suitable time-constant circuits (not shown) associated with the Zener diodes 261 and 266 may be designed so that the line and frame scanning signals have the desired amplitudes, polarities and frequencies.

The solid state camera assembly incorporating one embodiment of the invention is shown in FIGURE 6. The illustrated assembly includes a pair of optical shutters 300 and 302. These shutters may each be constructed in a manner similar to the construction of the light shutter cells 116 of the scanning system of FIGURE 2. When a biasing signal of a first polarity is applied across the biasing terminals of either of these shutters, the particular shutter is conditioned to pass a polarized light beam incident thereon. However, when the polarity of the biasing signal is reversed, the corresponding shutter, in effect, closes so that the polarized light incident thereon is not passed through the shutter.

The light from the image to be stored in the camera of FIGURE 6, and to be subsequently converted to an electrical signal, is focused by an optical system represented by a lens 304 through the shutter 300 onto the surface of the photo-conductive layer 104 of the storage unit 100. The details of the storage unit 100, and the manner in which it operated, were described in conjunction with FIGURE 1. The optical shutter 300 is positioned at the focal point of the light rays from the image, and it is controlled selectively to pass or to interrupt the light rays. A pair of Polaroid filters 306 and 310 are placed on opposite sides of the shutter 300 to polarize the light rays, so that the shutter will be effective in performing its selective function.

An optical system, represented by a lens 312, serves to focus the light from the scanning system of FIGURE 2 onto the ferroelectric layer 102 on the opposite surface of the photo-sensitive storage unit 100. The shutter 300 is positioned at the focal point of the latter light rays, and this latter shutter is controlled in the manner described selectively to pass or interrupt the light beams from the scanning system to the unit 100. A first polarizing or Polaroid filter 314 is interposed between the light source 250 and the scanning system of FIGURE 2 to permit the light shutter cells in the scanning system to perform their above-described function, and a second Polaroid filter 316 is positioned between the shutter 302 and the photo-sensitive storage unit 100 so that the shutter 302 may properly perform its light shutter function.

The battery 108 is connected through a reversing switch 320 to the shutters 300 and 302. The connection is such that when the switch 320 is in one position, the shutter 300 is open and the shutter 302 is closed; and when the switch 320 is in the other position, the shutter 300 is closed and the shutter 302 is open. The switch 320 also includes an additional arm and contacts, which serve to connect the battery source 108 across the photo-sensitive storage unit 100 with a particular polarity, when the switch 320 is in a position to open the shutter 300 and close the shutter 302; and to connect a resistor 322 and the battery source 108 in series across the storage unit 100 with opposite polarity when the switch 320 is reversed. A resulting video electrical output signal appears across the resistor 322 and across the terminals 324, 326 when the switch 320 is in its latter position. The terminals 324 and 326, as illustrated, are connected to the opposite sides of the resistor 322.

When the switch 320 is in its upper position, the voltages applied to the shutters 300 and 302 have polarities such that the shutter 300 is opened and the shutter 302 is closed, as noted above. This permits the light from the object to be passed by the shutter 300 to the photo-conductive face of the photo-sensitive storage unit 100, and it causes the light spot from the source 250 as passed through the scanning system of FIGURE 2 to be blocked by the shutter 302.

In the manner described above, the passing of the light from the object to the unit 100 causes a multiplicity of localized domain rotations to build up across the ferroelectric layer 102 in the unit, these rotations being proportional to the different light and shade values of the image. This causes the image to be stored in the unit 100. This storage can be accomplished in less than 20 microseconds, after which the switch 320 may be moved to its upper position.

When the switch 320 is in its lower position, as illustrated in FIGURE 6, the polarities of the voltages applied to the storage unit 100 and the shutters 300 and 302 are reversed, and the resistor 322 is connected in circuit with the image storage unit 100. The shutter 300 now closes to cut off the light from the object, and the shutter 302 opens to pass the light spots to the photo-sensitive storage unit from the source 250 through the scanning system of FIGURE 2. The scanning system, under the action of the scanning signals, and as described above, causes the small spot of light to impinge successively on different localized areas of the ferroelectric surface of the unit 100 in a line-by-line manner, and in successive fields.

The light of the scanning spot incident on the ferroelectric surface of the unit 100 in FIGURE 6 is polarized by the filter 316 such that it is able to pass through the ferroelectric layer of the unit 100 to the photo-conductive layer 104 only to the extent the corresponding localized domains of the ferroelectric layer 102 have been rotated when the image was stored in the unit. Therefore, an electrical signal will be produced across the resistor 322, which has amplitude variations corresponding to the amount of light reaching the photo-conductive layer through the ferroelectric layer 102 of the unit 100, as the polarized light spots from the scanning system scan the ferroelectric surface 102 of the unit 100 in FIGURE 6.

As noted above, since the reading signals flowing through the unit 100 during the scanning operation flow in the reverse direction, as compared with the writing signal during the image storage operation, the light spot from the scanning system effectively erases the stored image from the unit 100. In this manner, the unit 100 is immediately prepared for a new image storage after each read-out operation. Also, as noted, this erasing may be modified or attenuated by using only a portion of the voltage from 108 during the read out, in which case the stored image or pattern may be read out several times before the pattern is attenuated to a point of illegibility.

The invention provides, therefore, an improved electronic camera unit of a solid state type, which is capable of storing visual information by molecular effects; and an associated system for subsequently reading out the stored information and for causing the information to be transformed to an electrical signal.

What is claimed is:

1. A solid state image storage unit including: first electrically conductive electrode means, second electrically conductive electrode means, said first and second electrically conductive electrode means being disposed respectively in spaced and parallel planes, a layer of ferroelectric material interposed between said planes of said first and second electrode means parallel thereto and adjacent said first electrode means, a layer of photo-conductive material interposed between said layer of ferroelectric material and said second electrode means parallel thereto and adjacent said layer of ferroelectric material and said second electrode means, so that said layer of ferroelectric material and said layer of photo-conductive material are disposed adjacent one another and sandwiched between said first and second electrode means, means for projecting light through said second electrode means onto the surface of said photo-conductive layer to introduce a visual image to said photo-conductive layer, and means for applying a unidirectional voltage across said first and second electrodes to produce polarized effects in said layer of ferroelectric material as a function of the light and shade values of said visual image.

2. A solid state image storage unit including: a first planar transparent electrically conductive electrode, a second planar transparent electrically conductive electrode spaced and parallel with respect to said first electrode, a layer of ferroelectric material interposed between said first and second electrodes contacting said first electrode and establishing electrical contact therewith, a layer of photo-conductive material interposed between said first and second electrodes contacting said second electrode and establishing electrical contact therewith, means for introducing a visual image to said photo-conductive layer, and means for applying a unidirectional voltage across said first and second electrodes to produce polarized effects in said layer of ferroelectric material as a function of the light and shade values of said visual image.

3. A solid state image storage unit including: a first planar transparent electrically conductive electrode, a second planar transparent electrically conductive electrode spaced from and parallel to said first electrode, a layer of ferroelectric material interposed between said first and second electrodes and contacting said first electrode to establish electrical contact therewith, a layer of photo-conductive material interposed between said first and second electrodes and contacting said second electrode to establish electrical contact therewith, optical means for projecting a visual image through said second electrode onto said layer of photo-conductive material to provide localized different values in the resistance of such photo-conductive layer across the surface thereof in correspondence with the light and shade values of said image, and means for applying a unidirectional voltage across said electrodes to produce different localized polarized effects in said layer of ferroelectric material across the surface thereof in correspondence with the different values in resistance of said layer of photo-conductive material.

4. The image storage unit of claim 3 and which includes associated scanning means for effectively scanning a light spot through said first electrode across the surface of said ferroelectric layer, and circuit means coupled to said electrodes for deriving an electrical output signal indicative of the stored image in response to such scanning of said light spot by said scanning means.

5. The storage unit of claim 4 and which includes switching means in said circuit means for reversing the polarity of said unidirectional voltage applied across said electrodes for said scanning of said light spot by said scanning means effectively to erase said image stored in the unit.

6. A solid state electronic camera unit including: first and second electrically conductive electrode means, a layer of ferroelectric material adjacent and in electrical contact with said first electrode means, and a layer of photo-conductive material adjacent and in electrical contact with said second electrode means, said layer of ferroelectric material and said layer of photo-conductive material being sandwiched in side-by-side relationship between said electrode means, means for projecting an image through one of said electrode means onto said layer of photo-conductive material, and means for introducing a voltage across said electrode means to produce polarized effects in localized areas of said layer of ferroelectric material in accordance with the light and shade values of the image projected onto said layer of photo-conductive material.

7. The combination defined in claim 6 and which includes scanning means for effectively causing a light spot to scan said layer of photo-conductive material through the localized areas of said layer of ferroelectric material, and electrical impedance means coupled to said electrode means for producing an electric signal in response to such scanning of said light spot.

8. The combination defined in claim 7 and which includes a first electronic shutter disposed between said projecting means and said layer of photo-conductive material, and a second electronic shutter disposed between said scanning means and said layer of ferroelectric material, and control means for alternately causing the said electronic shutters to pass light to respective ones of said layers of photo-conductive material and ferroelectric material.

9. The combination defined in claim 8 and in which each of said electronic shutters includes a pair of transparent electrically conductive electrodes, and a layer of ferroelectric material sandwiched between said electrodes, and said control means serves to selectively introduce a voltage of a first polarity and of a second opposite polarity across said electrodes.

10. The combination defined in claim 8 and which includes a first polarized filter disposed between said first shutter and said layer of photo-conductive material and a second polarized filter disposed between said second shutter and said layer of ferroelectric material.

11. The combination defined in claim 7 and which includes a light source for said light spot comprising a plate of radioactive material and a phosphor coating on said plate to be excited thereby.

12. The combination defined in claim 11 and which includes capacitor means formed on said plate of radioactive material for producing scanning signals for said scanning means.

13. The combination defined in claim 11 and in which said plate is composed of material including tantalum.

References Cited in the file of this patent

UNITED STATES PATENTS

| | | |
|---|---|---|
| 1,997,371 | Loiseau | Apr. 9, 1935 |
| 2,897,399 | Garwin | July 28, 1959 |
| 2,905,830 | Kazan | Sept. 22, 1959 |
| 2,928,075 | Anderson | Mar. 8, 1960 |